Oct. 6, 1942.      G. E. FRANCK      2,298,117

QUICK COUPLER FOR TUBING

Filed Sept. 18, 1940

INVENTOR.
George E. Franck
BY Bair & Freeman
ATTORNEYS

Patented Oct. 6, 1942

2,298,117

UNITED STATES PATENT OFFICE 2,298,117

QUICK COUPLER FOR TUBING

George E. Franck, Riverside, Ill., assignor to The Imperial Brass Manufacturing Company, Chicago, Ill., a corporation of Illinois Application September 18, 1940, Serial No. 357,261

2 Claims. (Cl. 285—97.3)

My invention relates to quick couplers used for making temporary connections of copper or flexible tubing to compressor fittings, tubing lines, valves and the like, through which gas under a relatively high pressure is passed.

Among the objects of my invention is to provide a new and improved quick coupler device which can be manually attached to a fitting without the use of a wrench or other tool and screwed tightly enough so that there will be no leak of gas at the temporary fitting even though the gas passing within is at a relatively high pressure.

Another object of my invention is to provide a new and improved quick coupler which can be threaded upon a fitting by pressure applied only by means of the hand and which contains a sealing element which fits snugly and tightly over the end of the fitting, thereby preventing any leak of gas outwardly at the coupler joint.

Still another object is to provide a new and improved quick coupler for tubing which is equipped to be fastened permanently to the end of a fluid line which may be copper or flexible tubing and which has at the other end a coupler element including a resilient sealing device permanently attached to the body of the quick coupler itself but which can be manipulated so that the sealing device can be ejected for ready removal and replacement after it becomes worn.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1:
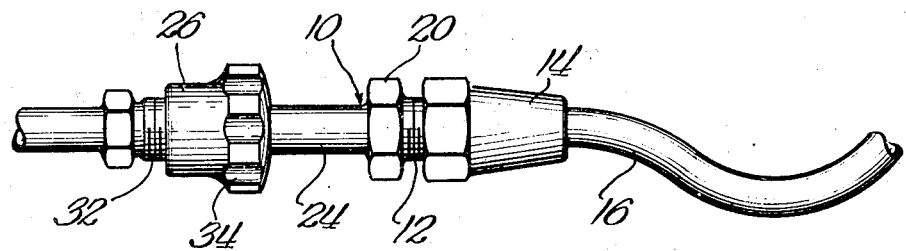
Figure 1 is an elevational view of my device showing it attached at one end to a tubing line and at the other end to a fitting.

In the past couplers have been used for temporarily attaching a liquid line to a fitting and have found rather wide use in the refrigeration industry where it is common practice to temporarily connect a tubing line from a gas cylinder to a fitting on a compressor for either feeding gas into the refrigeration system or collecting gas from it.

It is of course necessary even in a temporary coupling to make the connection so tight that refrigeration gases which are often highly volatile and kept under a considerably high pressure may not leak at the temporary joint. In order to accomplish this it has been the practice in the past to make up the joint by using a wrench or other tool in order to seat the coupler very tightly upon the fitting. Making up a joint in this manner takes more time than should be necessary and frequently results in the operator making too tight a joint so that the parts of both the coupler and the fitting wear out rapidly.

In my device the quick coupler shown after once being attached to a tubing line is manipulated entirely by hand and is provided with only one part which is subjected to wear, this part being a resilient element which can be quickly and readily extracted and replaced whenever a change should become necessary.

As shown on the drawing my quick coupler device comprises a body 10 which may have a threaded end 12 designed to be engaged by a nut 14 of the type commonly known as an "S. A. E." flared fitting.

In the particular embodiment shown the fitting is used to connect a length of copper tubing 16 to the coupler device by means of a flare 18 formed in the tubing but it is contemplated that other kinds of tubing might be used effectively.

The body is likewise provided with a hexagonal wrench engaging portion 20 which is used when the tubing is connected to the coupler device. Within the body is a passage 22 to permit the flow of fluid through the coupler device.

A shank 24 forms the other end of the body and upon the shank is mounted a coupler element 26. The coupler element has a recess 28 partially threaded as at 30 so that it can be screwed over a fitting 32. The coupler element itself is provided with a knurled or fluted hand hold 34 at the outermost circumberence to supply a firm non-slipping grip when the operator attaches the coupler to the fitting.

The shank 24 extends through a passage 36 in the coupler element. At a point adjacent the end, inside the coupler element, there is provided an annular recess 38 in the outer circumference of the shank. A split ring 40 is shown positioned in the annular recess protruding beyond the circumference of the outer wall of the shank and designed to engage a shoulder 42 within the coupler element formed at the junction of the passage 36 with the recess 28.

Likewise at the free end of the shank and within the recess 28 there is a reduced portion 44 which forms a shoulder 46 adjacent the annular recess. An annular ring 48 of rubber or similar material capable of withstanding the action of fluids with which the coupler may be used is positioned around the reduced portion and fitted between a wall of the reduced portion and the surrounding wall of the aperture 28.

It will be noted that the resilient ring protrudes beyond the end of the shank 24 for some distance. It will further be noted that the resilient ring abuts the shoulder 46 and is thereby prevented from being driven any farther into the aperture 28 than is permitted by the position of the shoulder.

Figure 2:
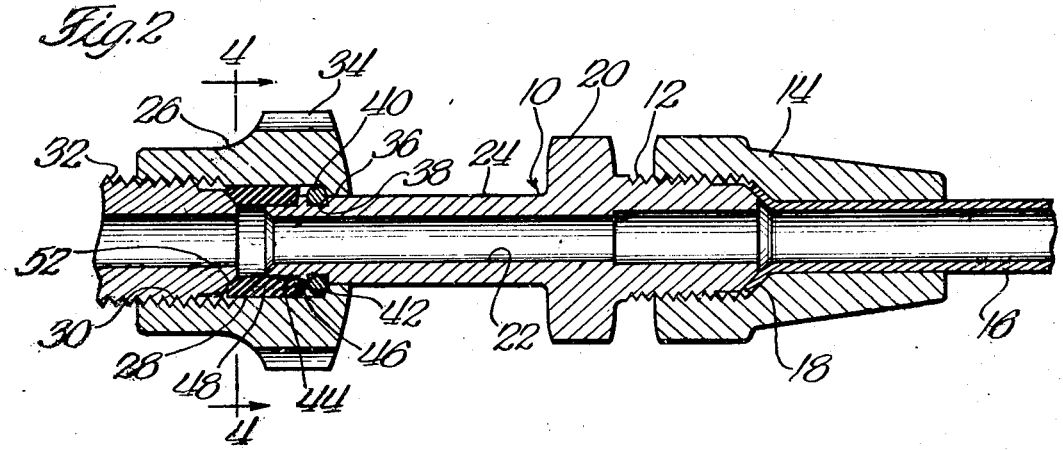
Figure 2 is a sectional view drawn to a larger scale.
Figure 3:
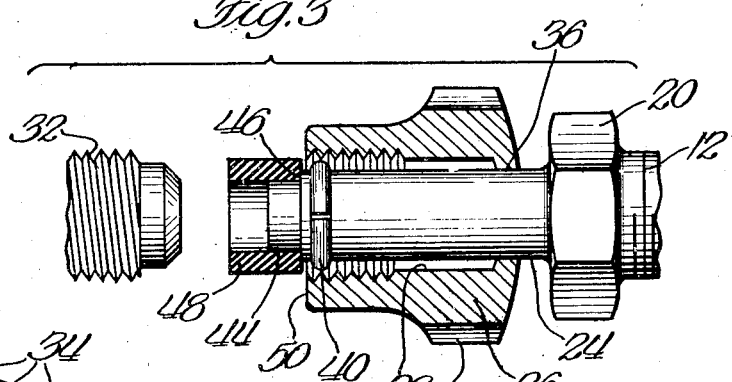
Figure 3 is an exploded view of the end of the coupler element which is attached to the fitting.
Figure 4:
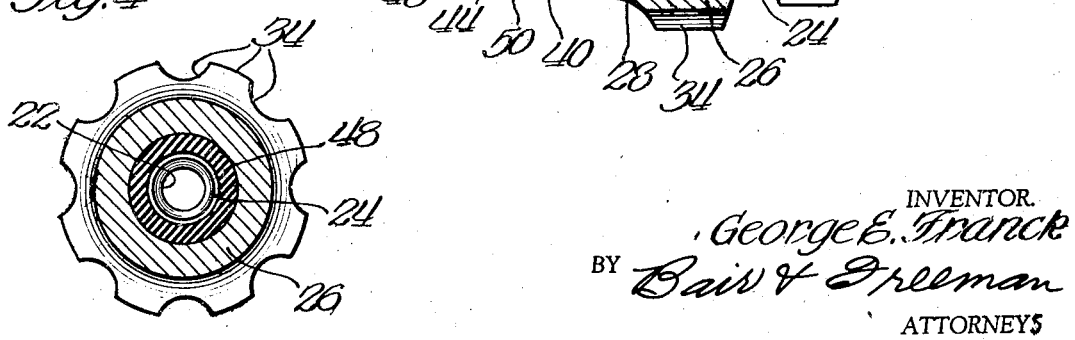
Figure 4 is a cross section taken on the line 4—4 of Figure 2.

In assembling the device the shank 24 is first inserted into the passage 36 so that the end extends beyond a bottom end 50 of the coupler element 26. The split ring 40 is then snapped into place which prevents any separation of the parts. Next the annular ring 48 is positioned around the reduced portion 44 as shown in Figure 3 and then pressed into the recess 28 to the position substantially as shown in Figure 2. This is the normal position of the parts of the quick coupler device.

Next, the tubing line 16 is attached to the right hand end of the coupler device as viewed in Figures 1 and 2 by some suitable means such as the S. A. E. nut shown in the drawing.

When it is desired to attach the quick coupler device to a fitting it is only necessary to threadably engage the coupler element 26 over a fitting having corresponding threads and screw it up snugly by hand until the end of the fitting presses against the annular ring forming a sealed contact 52 therebetween.

Since the annular ring is of a resilient material and is at the same time confined by the walls of the recess 28, no undue expansion of it is permitted but due to its resilient character it forms a tight seal at the end of the fitting when the coupler element is screwed down by hand.

By the same application of manual pressure the annular ring of resilient material likewise is pressed into a snug sealing connection with the reduced portion 44 of the shank and the two sealed connections form a tight fit which prevents any leakage of fluid subsequently passed through the coupler device, out into the atmosphere.

Should the annular ring become worn it is necessary only to press the coupler element 26 toward the wrench engaging portion 20 by which action the reduced end of the shank is extended out of the aperture 28 exposing the resilient annular ring. It then becomes a simple matter to remove the ring and replace it with a new one after which parts are pushed back into place in the recess the same as when the coupling device was originally assembled. No other disassembly of the device is necessary since the split ring 40 forms only a stop and has no function as a sealing element.

There has thus been provided a quickly manipulated coupling device by means of which a tube can be rapidly connected and disconnected to a fitting in order to form a removable tight and temporary seal, the coupler device being provided with relatively few parts, any of which may be easily removed and replaced.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a quick temporary coupler for attaching tubing to a fitting having a body, a connection at one end for the tubing and a coupler attachment at the other end comprising a substantially cylindrical extension having a passage therethrough, a coupler element having a passage therein loosely surrounding the extension near the end, said coupler element having an aperture larger in diameter than the passage forming a shoulder therebetween and threaded at the outer end for engagement with a conventional flared fitting, said extension having an outwardly extending anchoring element thereon engaging said shoulder forming a swivel connection and an annular recess extending inwardly from the end forming an annular pocket between itself and the aperture wall, substantially closed at one end and open at the other end, and a removable annular collar of resilient material having a sliding fit on the recessed portion of the extension with one end seated in the closed end of the pocket and the other end extending for a substantial portion of its length beyond the open end of said pocket, said collar being flared complementarily to the conventional flared fitting and initially snugly filling said pocket providing frictional resistance to sliding of the coupler element along the extension and in coupled relation being in engagement around the flare of said conventional fitting and under pressure longitudinally and outwardly for sealing said coupling against leakage of fluid from within the tube.

2. In a quick temporary coupler for attaching tubing to a fitting having a body, a connection at one end for the tubing and a coupler attachment at the other end comprising a substantially cylindrical extension having a passage therethrough, a coupler element having a passage therein loosely surrounding the extension near the end, said coupler element having an aperture larger in diameter than the passage forming a shoulder therebetween and threaded at the outer end for engagement with a conventional flared fitting, said extension having an outwardly extending anchoring element thereon engaging said shoulder forming a swivel connection and a removable annular collar of resilient material having a sliding fit on the end of said extension with one end thereof bearing longitudinally against a portion of the extension and the other end extending beyond the extension for a substantial portion of its length, said collar having an inside diameter at the free end larger than the outside diameter of the small end of said conventional flared fitting, said collar being initially snugly positioned between the extension and surrounding aperture wall providing a frictional resistance to sliding the coupler element along the extension and said collar during the making up and completion of the coupling being engaged around the flare of said conventional fitting and under substantially longitudinal and radial compression for sealing the coupling against leakage of fluid from within the tube.

GEORGE E. FRANCK.